(12) United States Patent
Bedingfield

(10) Patent No.: US 9,540,749 B2
(45) Date of Patent: Jan. 10, 2017

(54) MONOFILAMENT JACKETED WOVEN TAPE

(71) Applicant: MILLIKEN & COMPANY, Spartanburg, SC (US)

(72) Inventor: Steven L. Bedingfield, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 260 days.

(21) Appl. No.: 14/332,945

(22) Filed: Jul. 16, 2014

(65) Prior Publication Data

US 2016/0017523 A1   Jan. 21, 2016

(51) Int. Cl.
*D03D 3/00* (2006.01)
*D07B 1/02* (2006.01)
(Continued)

(52) U.S. Cl.
CPC ............ *D03D 3/005* (2013.01); *D03D 1/0005* (2013.01); *D03D 11/00* (2013.01); *D07B 1/02* (2013.01); *D07B 1/16* (2013.01); *D07B 1/22* (2013.01); *G02B 6/54* (2013.01); *D07B 1/025* (2013.01); *D07B 1/06* (2013.01); *D07B 5/005* (2013.01); *D07B 5/02* (2013.01); *D07B 2201/2006* (2013.01); *D07B 2201/2012* (2013.01); *D07B 2201/20903* (2015.07); *D07B 2205/103* (2013.01); *D07B 2205/106* (2013.01); *D07B 2205/201* (2013.01); *D07B 2205/205* (2013.01); *D07B 2205/2039* (2013.01); *D07B 2205/2071* (2013.01); *D07B 2205/2082* (2013.01);

(Continued)

(58) Field of Classification Search
CPC .......... D03D 3/005; D03D 3/02; D03D 11/00; D07B 1/16
See application file for complete search history.

(56) References Cited

U.S. PATENT DOCUMENTS 4,504,696 A * 3/1985 Piper ...................... H01B 7/083
156/47
5,380,954 A * 1/1995 Orr, Jr. ................... H01B 7/083
139/425 R
(Continued)

FOREIGN PATENT DOCUMENTS

CN   102234941   11/2011
WO   WO 2006/055995   6/2006

OTHER PUBLICATIONS

Patent Cooperation Treaty PCT International Search Report. Date of Mailing, Dec. 18, 2015. International Application No. PCT/US2015/038790. Date of Filing, Jul. 1, 2015.

(Continued)

*Primary Examiner* — Shaun R Hurley
(74) *Attorney, Agent, or Firm* — Cheryl J. Brickey

(57) ABSTRACT

A woven rope an inner portion comprising a plurality of multifilament fibers in the length direction of the woven rope and a jacket portion covering the inner portion. The jacket portion contains a plurality of monofilament fibers in the length direction of the woven rope and at least one multifilament fiber in the circumferential direction interwoven with the monofilament fibers in the length direction of the jacket portion. The monofilament fibers of the jacket portion form the majority of the outer surface of the woven rope.

12 Claims, 2 Drawing Sheets

(51) Int. Cl.
*D03D 1/00* (2006.01)
*D03D 11/00* (2006.01)
*D07B 1/16* (2006.01)
*D07B 1/22* (2006.01)
*G02B 6/54* (2006.01)
*D07B 1/06* (2006.01)
*D07B 5/00* (2006.01)
*D07B 5/02* (2006.01)
*G02B 6/44* (2006.01)
*H02G 1/08* (2006.01)

(52) U.S. Cl.
CPC ............... *D07B 2205/3003* (2013.01); *D07B 2205/3007* (2013.01); *D07B 2205/3025* (2013.01); *D07B 2401/2075* (2013.01); *G02B 6/4463* (2013.01); *H02G 1/083* (2013.01)

(56) References Cited

U.S. PATENT DOCUMENTS

| | | | |
|---|---|---|---|
| 5,727,357 A * | 3/1998 | Arumugasaamy | D07B 1/025 428/377 |
| 5,773,762 A * | 6/1998 | Orr, Jr. | H01B 7/083 174/117 M |
| 6,838,614 B2 * | 1/2005 | Silverman | F16L 11/22 166/242.3 |
| 6,974,169 B1 | 12/2005 | Upton | 294/86.42 |
| 7,188,642 B2 | 3/2007 | James et al. | 139/384 R |
| 7,325,575 B1 | 2/2008 | O'Donnell et al. | 138/110 |
| 7,754,971 B2 | 7/2010 | Bedingfield et al. | 174/117 M |
| 2010/0276650 A1 | 11/2010 | Allen | 254/134.3 |
| 2010/0313989 A1 | 12/2010 | Kashihara | 139/387 R |
| 2012/0073856 A1 | 3/2012 | Montena | 174/105 R |
| 2012/0073860 A1 | 3/2012 | Allen | 174/135 |
| 2013/0228248 A1 * | 9/2013 | Malloy | D03D 3/02 139/35 |
| 2014/0174586 A1 * | 6/2014 | He | D03D 5/00 139/421 |

OTHER PUBLICATIONS

Anonymous: "Samson: Line Selection Guide: Running Rigging", Apr. 19, 2009 (Apr. 19, 2009), XP055208902, Internet. Retrieved from the Internet: URL:http://web.archive.org/web/20090419111333/http://www.wescovan.com/catalogs/recmarine.pdf. [retrieved on Aug. 21, 2015] p. 9, 17.

* cited by examiner

MONOFILAMENT JACKETED WOVEN TAPE

FIELD OF THE INVENTION

The present invention generally relates to woven ropes for use in facilitating the positioning of elongated items within conduits and protective sleeves.

BACKGROUND

Elongated elements such as cables and optical fiber cable bundles used for telephone, video or computer communication networks are often installed in protective conduits buried in the ground. Once the conduit installed, it is sometimes difficult to introduce cables and the like into the conduit, especially small conduits having multiple turns. It would be advantageous to have a woven pull rope which can facilitate the positioning of elongated elements within conduits and protective sleeves within conduits.

BRIEF SUMMARY

A woven rope an inner portion comprising a plurality of multifilament fibers in the length direction of the woven rope and a jacket portion covering the inner portion. The jacket portion contains a plurality of monofilament fibers in the length direction of the woven rope and at least one multifilament fiber in the circumferential direction interwoven with the monofilament fibers in the length direction of the jacket portion. The monofilament fibers of the jacket portion form the majority of the outer surface of the woven rope.

DETAILED DESCRIPTION

Flat tapes have been traditionally been used as pull tapes for some innerduct applications because it prevents the duct from being cut due to high friction heat. The ducts used with the flat tapes are typically layers (about 2"-4" or 5-10 cm range). These larger ducts allow room for the tape to move around easier and break free during the initial start of a pull. Smaller ducts (typically less than about 4 or 5 cm) may not have the room needed for the flat tape to break free.

With the use of the woven rope 10, instead of a woven tape, the rope not only protects the cable but also protects the duct. In the smaller ducts a rope may be preferred lower surface contact with the side wall and allows the rope to "break free" during the start of the pull and which leads to lower pulling tensions.

The woven rope is used to facilitate the positioning of elongated items (such as cables) within a conduit (also referred to as a pipe or tube) and within protective sleeves (such as innerduct sleeve structures).

"Yarn", in this application, as used herein includes a monofilament elongated body, a multifilament elongated body, ribbon, strip, fiber, tape, and the like. The term yarn includes a plurality of any one or combination of the above. The yarns may be of any suitable form such as continuous, spun staple yarn, monofilament, or multifilament, single component, bi-component, or multi-component, and have any suitable cross-section shape such as circular, multi-lobal, square or rectangular (tape), and oval.

Figure 1:
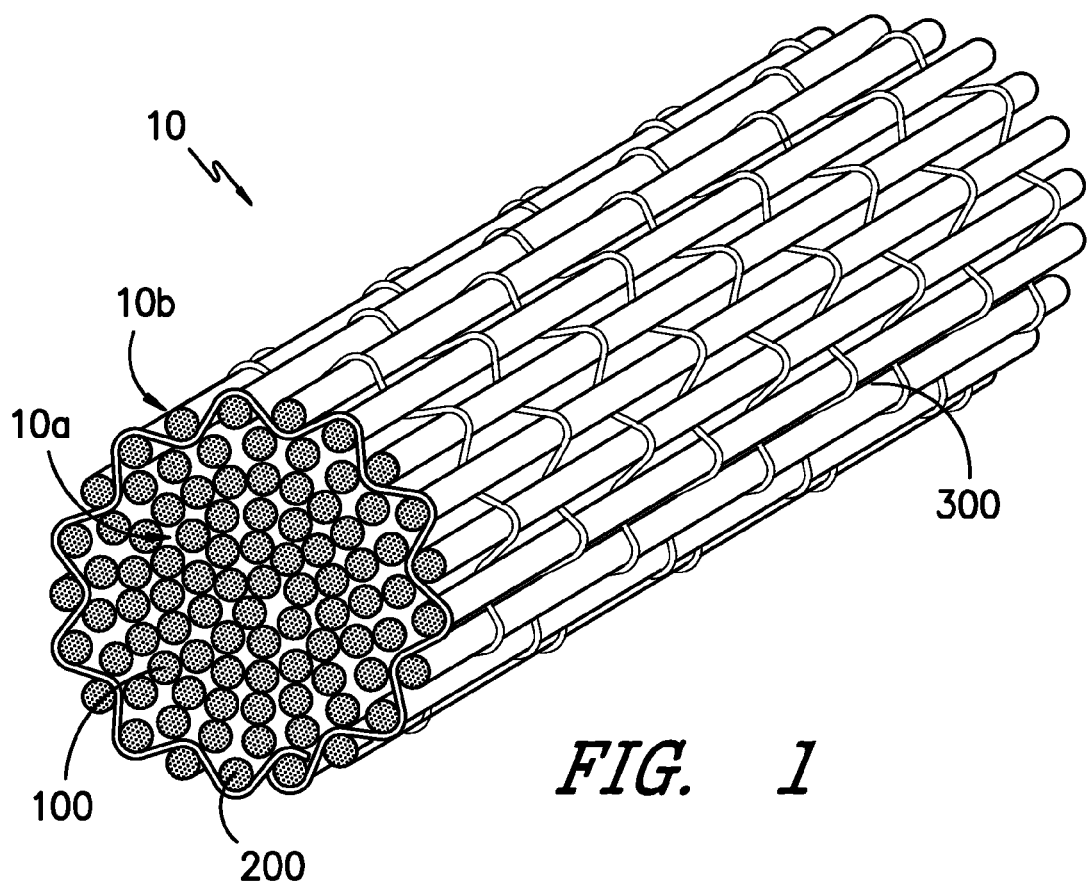
FIG. 1 illustrates schematically an embodiment of an exemplary woven rope.
Figure 2:
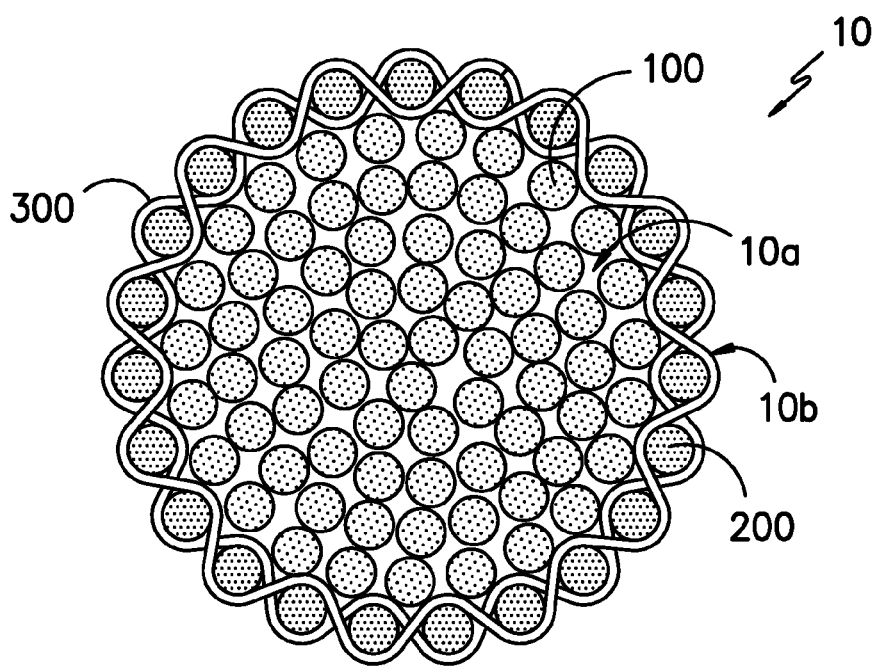
FIG. 2 illustrates schematically a cross-section of an exemplary woven rope having a circular shaped cross-section.
Figure 3:
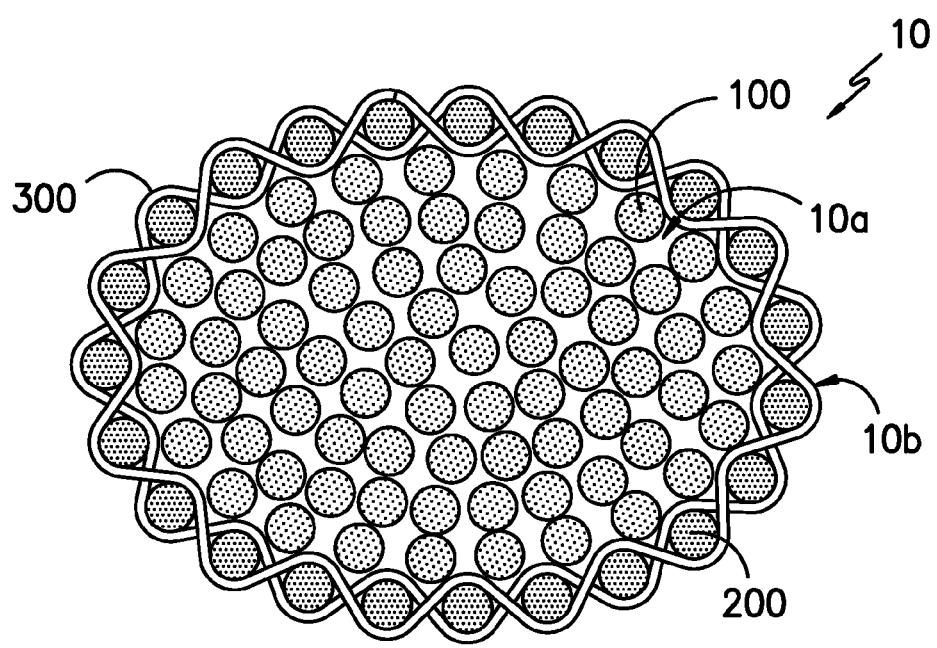
FIG. 3 illustrates schematically a cross-section of an exemplary woven rope having an oval shaped cross-section.
Figure 4:
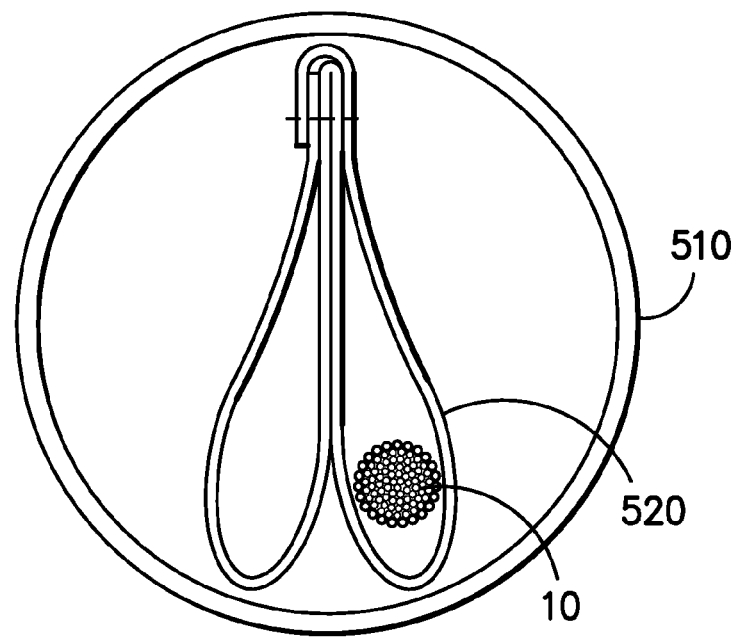
FIG. 4 illustrates one embodiment of an exemplary woven rope in an innerduct structure within a conduit.

In FIG. 1, there is shown one embodiment of a woven rope 10. The woven rope 10 contains an inner portion 10a, a jacket portion 10b and a length direction (direction along the length of the rope). The jacket portion 10b covers the inner portion 10a along the length of the rope 10 and forms the outer surface of the rope 10. The rope 10 may have any suitable cross-sectional shape such as circular, FIG. 2, or elliptical, FIG. 3. In one embodiment, the rope 10 exhibits a tensile strength of between about 400 lbs and about 3,000 lbs. FIG. 4 illustrates one embodiment of the rope 10 in an innerduct structure 520 within a conduit 510.

The inner portion 10a of the rope 10 contains yarns 100. The yarns 100 may be any suitable yarn and extend in the length direction of the rope. Preferably, the yarns 100 are not woven or intertwined with each other (to a significant degree) and each extend along the length of the rope 10. Preferably, the yarns 100 are continuous multifilament yarns. In one embodiment the inner portion 10a of the rope 10 contains between about 15-40 ends of multifilament yarn 100. Each end of the yarn has preferably has at least about 200 filaments, more preferably between about 300 and 600 filaments per end. In one embodiment, the total denier of all of the yarns 100 is between about 5,000 and 60,000, more preferably between about 10,000 and 40,000.

Some suitable materials for the yarns 100 include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

Preferably, the yarns 100 are multifilament yarns and have a tensile strength of at least about 1000 lbs, more preferably at least about 1200 lbs, more preferably at least about 2500 lbs, more preferably at least about 3000 lbs. Having the yarns 100 have a high tensile strength helps give the rope strength to support high load cable pulls. In one preferred embodiment, the yarns 100 are continuous multifilament, polyester yarns, which are preferred for their tensile strength and cost.

Referring back to FIG. 1, the jacket portion 10b of the rope 10 which covers the inner portion (preferably completely covering the inner portion 10a along the rope 10 length in the length direction) and contains a plurality of woven yarns which form the outer surface of the rope 10. In one embodiment, the jacket portion 10b contains a plurality of yarns 200 in a first direction along the length of the rope 10 (also known as the machine direction or warp direction) and at least one yarn 300 which is interwoven with the yarns 200 and is in a direction normal to the yarns (also referred to as the circumferential direction, the filling direction, the weft direction, and the cross-machine direction).

In a preferred embodiment, the jacket portion 10b contains a plurality of monofilament yarns 200 in a first direction along the length of the rope 10 and at least one multifilament yarn 300 which is interwoven with the monofilament yarns 200 and is in a direction normal to the monofilament yarns 200. The yarns 200 and 300 may be any suitable construction and material such as those disclosed for the yarns 100 in the inner portion 10a. Preferably, the yarns 200 have a tensile strength of at least about 100 lbs, more preferably at least about 500 lbs, more preferably at least about 1200 lbs, more preferably at least about 3000 lbs.

Preferably, a majority of the outer surface of the rope 10 is formed by the yarns 200 which are preferably monofilaments. In one embodiment, at least about 50%, more preferably at least about 75%, more preferably at least about 90%, more preferably at least about 95% of the outer surface of the rope 10 are the monofilament yarns 200.

Preferably, the yarns 200 (preferably monofilament yarns 200) are formed from monofilaments having a low coefficient of friction. This can be achieved, for example of forming the yarns 200 out of a low coefficient material such as polyethylene or by coating the yarns 200 with a low coefficient of friction material such as fluorinated coating (ex. PTFE). The monofilament yarns have a low coefficient of friction which allows for the rope 10 to slide within the duct more easily and allow for lower pull forces to be used to place the rope 10 into a duct. In one embodiment, the yarns 200 have a lower coefficient of friction than the yarns 300.

In one embodiment, the dynamic or sliding coefficients of friction for the rope 10 is from about 0.04 to about 0.16, as well as an intermediate range of about 0.06 to about 0.14, and a narrower range of about 0.08 to about 0.13.

In one embodiment, the yarns 300 comprise one continuous multifilament yarn in the circumferential direction that is interwoven with the yarns 200 and is in a continuous looping spiral along the length of the rope 10. Having the yarn 300 be continuous may be preferred as this creates a jacket having no seam which reduces the coefficient of friction of the rope 10. The yarn 300 has the purpose to hold the monofilament yarns 200 in place to form the jacket portion 10b of the rope 10. Preferably, the yarns 300 have a tensile strength of at least about 400 lbs, more preferably at least about 1200 lbs, more preferably at least about 2500 lbs, more preferably at least about 3000 lbs.

The woven yarns 200, 300 of the jacket portion 10b may be in any suitable weave construction including, for example, plain, satin, twill, rib, basket-weave, poplin, jacquard, and crepe weave textiles. In one embodiment, the yarns 200, 300 are in a twill weave construction. In another embodiment, the yarns 200, 300 are preferably in the rib weave construction. A twill or rib weave may be preferred as it allows more warp direction (longitudinal) direction yarns to be on the surface reducing the friction and in theory lowering the COF.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A woven rope having a length direction, a circumferential direction, and an outer surface, wherein the woven rope comprises:
    an inner portion comprising a plurality of multifilament yarns in the length direction of the woven rope; and,
    a jacket portion, wherein the jacket portion covers the inner portion, wherein the jacket portion comprises a plurality of monofilament yarns in the length direction of the woven rope and at least one multifilament yarn in the circumferential direction interwoven with the monofilament yarns in the length direction of the jacket portion and is in a continuous looping spiral along the length of the rope, wherein the monofilament yarns form the majority outer surface of the woven rope, and wherein the multifilament yarns in the inner portion of the rope are in intimate contact with the monofilament yarns in the jacket portion of the rope.

2. The woven rope of claim 1, wherein the multifilament yarns of the inner portion comprise polyester.

3. The woven rope of claim 1, wherein the multifilament yarns of the inner portion have a tenacity of greater than about 1,200 lbs.

4. The woven rope of claim 1, wherein the multifilament yarns of the jacket portion comprise polyester.

5. The woven rope of claim 1, wherein the multifilament yarns of the jacket portion have a tenacity of greater than about 3,000 lbs.

6. The woven rope of claim 1, wherein the monofilament yarns of the jacket portion comprise polyethylene.

7. The woven rope of claim 1, wherein the monofilament yarns in the jacket portion have a lower coefficient of friction than the multifilament yarns in the inner portion and the multifilament yarns in the jacket portion.

8. The woven rope of claim 1, wherein the monofilament yarns and multifilament yarns in the jacket portion are woven in a twill weave construction.

9. The woven rope of claim 1, wherein the monofilament yarns and multifilament yarns in the jacket portion are woven in a rib weave construction.

10. The woven rope of claim 1, wherein the woven rope has a cross-sectional shape that is circular.

11. The woven rope of claim 1, wherein the woven rope has a cross-sectional shape that is oval.

12. The woven rope of claim 1, wherein the jacket portion comprises one continuous multifilament yarn in the circumferential direction.

\* \* \* \* \*